(12) United States Patent
Houston

(10) Patent No.: US 10,072,507 B2
(45) Date of Patent: Sep. 11, 2018

(54) REDUNDANT AIRFOIL ATTACHMENT

(71) Applicant: United Technologies Corporation, Hartford, CT (US)

(72) Inventor: David P. Houston, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1062 days.

(21) Appl. No.: 13/660,455

(22) Filed: Oct. 25, 2012

(65) Prior Publication Data

US 2014/0119927 A1 May 1, 2014

(51) Int. Cl.
*F01D 5/30* (2006.01)
*F01D 21/04* (2006.01)
*F02K 3/04* (2006.01)

(52) U.S. Cl.
CPC ......... *F01D 5/3007* (2013.01); *F01D 21/045* (2013.01); *F02K 3/04* (2013.01); *F05D 2220/36* (2013.01); *Y10T 29/49321* (2015.01)

(58) Field of Classification Search
CPC . F01D 5/30; F01D 5/3007; F01D 5/02; F04D 29/322; F04D 29/34; F05D 2240/301; Y10T 29/49321
See application file for complete search history.

(56) References Cited

U.S. PATENT DOCUMENTS

| 3,045,968 A | 7/1962 | Willis |
| 4,019,832 A | 4/1977 | Salemme et al. |
| 4,453,890 A | 6/1984 | Brantley |
| 5,554,005 A | 9/1996 | Nguyen |
| 5,567,116 A | 10/1996 | Bourcier |
| 7,794,208 B2 | 9/2010 | Suzuki et al. |
| 2007/0237644 A1 | 10/2007 | Suzuki et al. |
| 2009/0022591 A1 | 1/2009 | Mujezinovic et al. |
| 2011/0085888 A1* | 4/2011 | Gouda .................... F01D 5/081 415/110 |
| 2011/0211967 A1 | 9/2011 | Deal et al. |
| 2011/0223027 A1 | 9/2011 | Klinetob et al. |
| 2012/0163995 A1* | 6/2012 | Wardle .................... F01D 5/081 416/97 R |

FOREIGN PATENT DOCUMENTS

| JP | S5993901 A | 5/1984 | |
| JP | 60240805 A | * 11/1985 | ............... F01D 5/30 |

OTHER PUBLICATIONS

JP60240805 Translation.*
International Search Report and Written Opinion for International Application No. PCT/US2013/066780 dated Aug. 14, 2014.
Supplementary European Search Report for European Application No. 13870915.9 completed Nov. 18, 2015.

* cited by examiner

*Primary Examiner* — David E Sosnowski
*Assistant Examiner* — Juan G Flores
(74) *Attorney, Agent, or Firm* — Carlson, Gaskey & Olds, P.C.

(57) ABSTRACT

An airfoil attachment according to one example of this disclosure includes an airfoil and a disk supporting the airfoil. Further, there are primary contact surfaces and secondary contact surfaces between the airfoil and the disk. The secondary contact surfaces are not engaged during a normal operating condition.

13 Claims, 3 Drawing Sheets

REDUNDANT AIRFOIL ATTACHMENT

BACKGROUND

This disclosure relates to airfoil attachments for gas turbine engines. In particular, this disclosure relates to an attachment between a root of an airfoil and a rotor of the engine. In one known airfoil attachment, the airfoil includes a dovetail root having a plurality of teeth, and each of the teeth are engaged with a respective cavity formed in the disk during normal operating conditions.

SUMMARY

An airfoil attachment according to one non-limiting embodiment of this disclosure includes an airfoil and a disk supporting the airfoil. The attachment further includes primary contact surfaces and secondary contact surfaces between the airfoil and the disk. The secondary contact surfaces are not engaged during a normal operating condition.

In a further non-limiting embodiment of the present disclosure, the secondary contact surfaces are configured to become engaged should there be a compromise in the primary contact surfaces.

In a further non-limiting embodiment of the present disclosure, the airfoil includes a root having a first tooth and the disk includes a first cavity, the primary contact surfaces provided by the first tooth being received in the first cavity.

In a further non-limiting embodiment of the present disclosure, during the normal operating condition, a radially outer surface of the first tooth contacts a radially outer surface of the first cavity.

In a further non-limiting embodiment of the present disclosure, the root of the airfoil includes a second tooth and the disk includes a second cavity, the secondary contact surfaces provided by the second tooth being received in the second cavity.

In a further non-limiting embodiment of the present disclosure, the first tooth and the second tooth are radially spaced from one another.

In a further non-limiting embodiment of the present disclosure, the second tooth is smaller than the first tooth in a radial dimension.

In a further non-limiting embodiment of the present disclosure, the second tooth becomes engaged with the second cavity should there be a compromise in the engagement between the first tooth and the first cavity.

In a further non-limiting embodiment of the present disclosure, a radially outer surface of the second tooth engages a radially outer surface of the second cavity should there be a compromise in the primary contact surfaces.

In a further non-limiting embodiment of the present disclosure, there is a gap between a radially outer surface of the second tooth and a radially outer surface of the second cavity.

A method for redundantly securing an airfoil to a disk according to a non-limiting embodiment of this disclosure includes providing primary contact surfaces and secondary contact surfaces between an airfoil and a disk. The primary contact surfaces are engaged during a normal operating condition, and the secondary contact surfaces are engaged should there be a compromise in the primary contact surfaces.

In a further non-limiting embodiment of the present disclosure, the secondary contact surfaces are not engaged during the normal operating condition.

In a further non-limiting embodiment of the present disclosure, the primary contact surfaces are provided by a first tooth of a root of the airfoil being received within a first cavity of the disk.

In a further non-limiting embodiment of the present disclosure, the secondary contact surfaces are provided by a second tooth of the root of the airfoil being received within a second cavity of the disk.

These and other features of the present disclosure can be best understood from the following drawings and detailed description.

BRIEF DESCRIPTION OF THE DRAWINGS

The drawings can be briefly described as follows.

DETAILED DESCRIPTION

Figure 1:
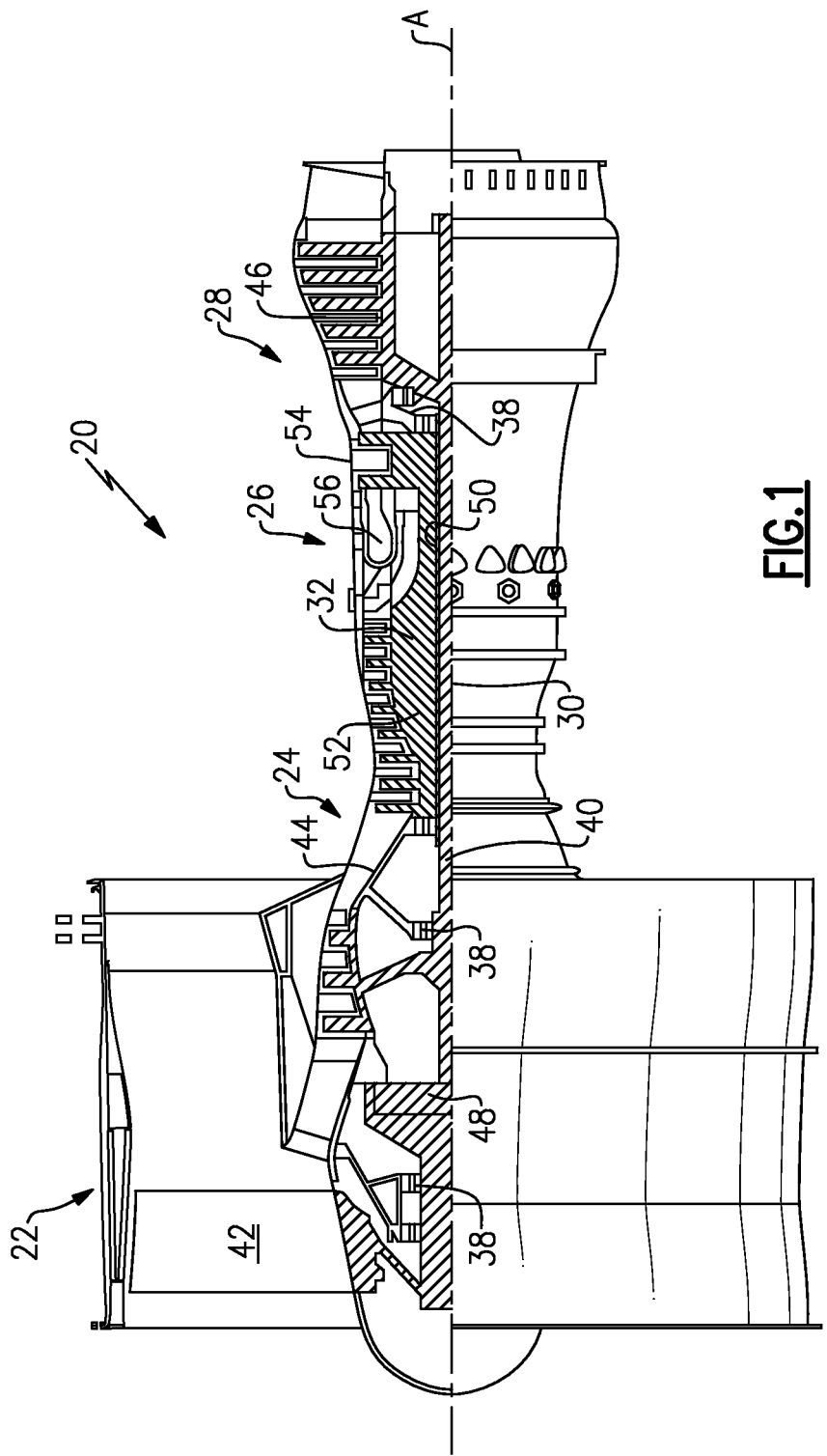
FIG. 1 illustrates an example gas turbine engine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram° R)/(518.7° R)]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
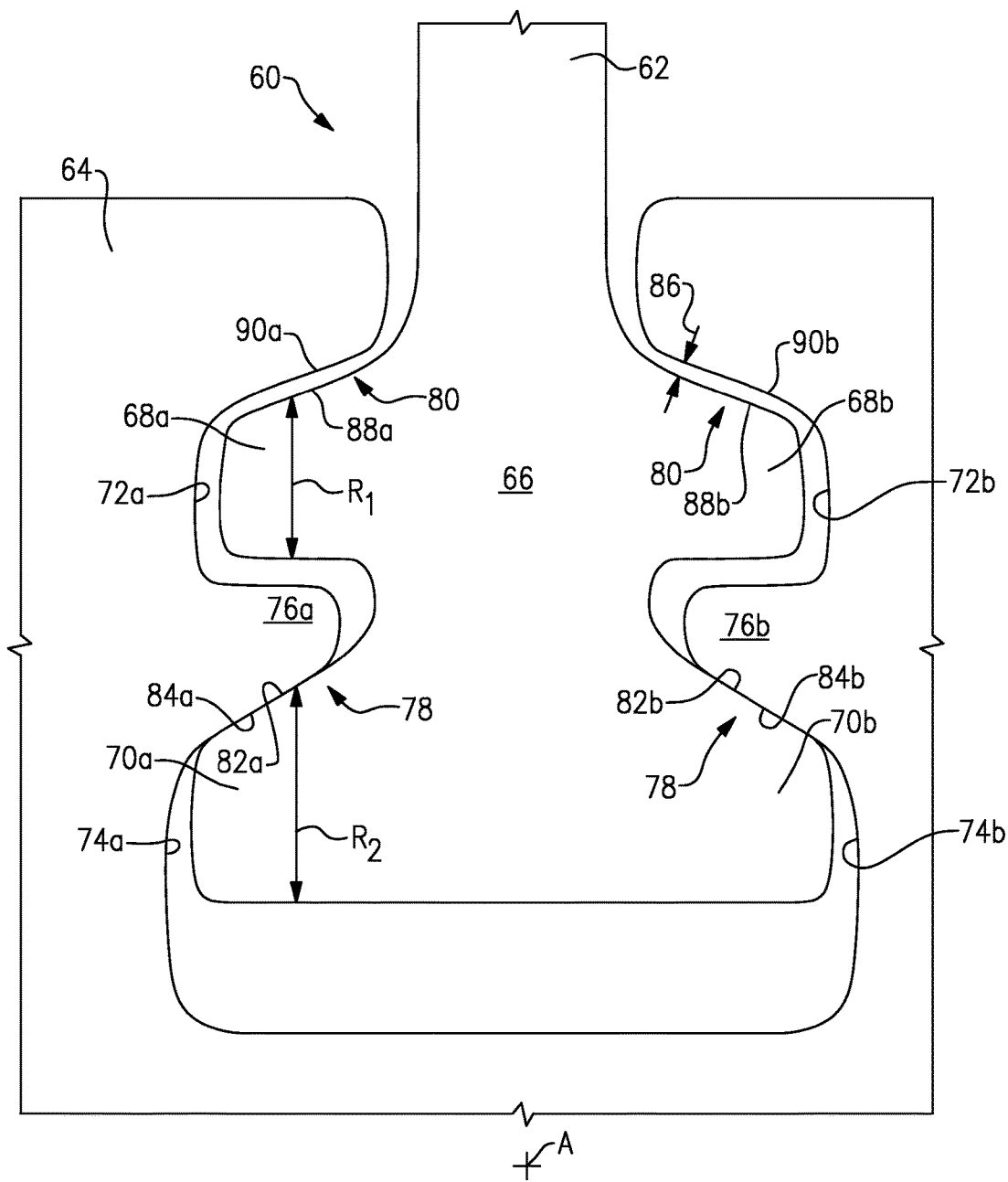
FIG. 2 illustrates an example airfoil attachment during a normal operating condition.

FIG. 2 illustrates an airfoil attachment 60 between an airfoil 62 and a disk, or rotor, 64. In one example, the airfoil 62 is a fan blade, and the disk 64 is rotated by the engine 10 to drive the fan 42. It should be understood however, that the airfoil attachment 60 is not limited to use with fan blades, and can also be used as an attachment for compressor blades and turbine blades, as examples.

In the illustrated example, the airfoil 62 includes a dovetail root section 66 having a first pair of teeth 68a-b, and a second pair of teeth 70a-b radially inward thereof (relative to the engine central longitudinal axis A). While two pairs of teeth 68a-b and 70a-b, are illustrated, it should be understood that this disclosure extends to airfoils that include any desired number of teeth. A pair of opposed cavities 72a-b, 74a-b corresponding to the teeth 68a-b, 70a-b, respectively, are formed in the disk 64 and are separated by projections 76a-b. In this example, the teeth 68a-b are radially aligned, and the teeth 70a-b are radially aligned.

With continued reference to FIG. 2, the airfoil attachment 60 provides primary contact surfaces 78 and secondary contact surfaces 80 between the airfoil 62 and the disk 64. During a normal operating condition, only the primary contact surfaces 78 are engaged (e.g., in contact with one another). As used herein, the normal operating condition is defined as a condition wherein the primary contact surfaces 78 are engaged and are sufficient to support the airfoil 62 relative to the disk 64 without the aid of the secondary contact surfaces 80. In the normal operating condition, the secondary contact surfaces 80 are essentially redundant, or standby, contact surfaces.

The primary contact surfaces 78 are provided by contact between the radially outer surfaces 82a-b of the teeth 70a-b, respectively, and the radially outer surfaces 84a-b of the cavities 74a-b. During the normal operating condition, the secondary contact surfaces 80 are not engaged, and there is a gap 86 between the radially outer surfaces 88a-b of the teeth 68a-b, respectively, and the radially outer surfaces 90a-90b of the cavities 72a-b. In this example, there is a gap around the entirety of the teeth 70a-b during the normal operating condition.

The gap 86 is provided, in one example, by dimensioning the cavities 72a-b, 74a-b relative to the dimensions of the teeth 68a-b, 70a-b. In this example, teeth 68a-b have a smaller radial dimension R1 than that of the teeth 70a-b, indicated at R2. The radial dimensions of the teeth 68a-b and 70a-b, could be the same, however and the gap 86 could be provided by changing the dimensions of the cavities 72a-b, 74a-b. Further, the gap 86, while illustrated as being relatively large, may in reality be perhaps only a few millimeters. This disclosure is not limited to any particular magnitude for the gap 86.

Figure 3:
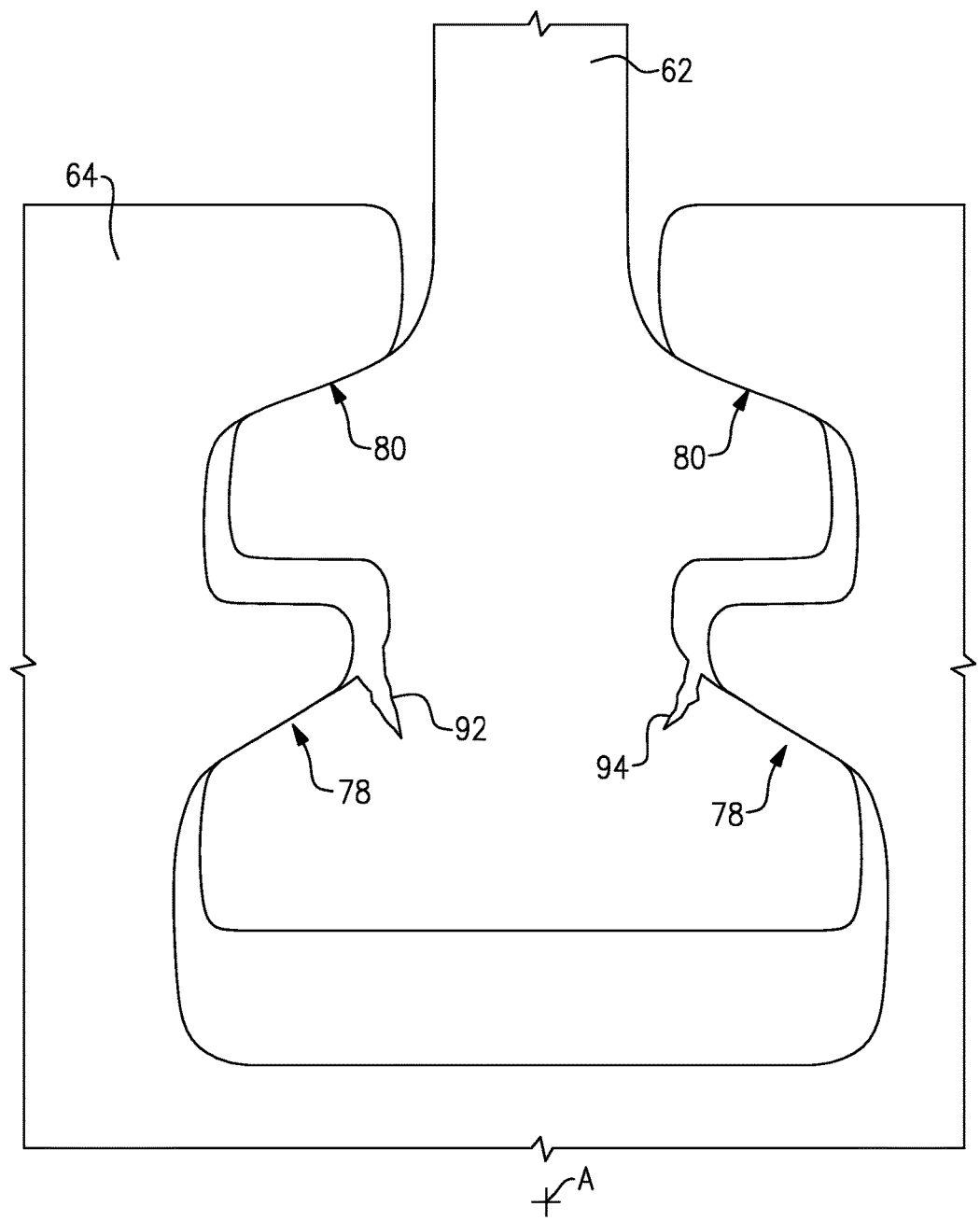
FIG. 3 illustrates the airfoil attachment of FIG. 2 when there is a compromise in the primary contact surfaces of the airfoil attachment.

Should there be a compromise in the primary contact surfaces 78, the secondary contact surfaces 80 will become engaged. FIG. 3 illustrates an example where there has been a compromise in the primary contact surfaces 78, by way of cracks, or fractures, 92, 94. For purposes of this disclosure, a "compromise" in the primary contact surfaces 78 includes conditions wherein the primary contact surfaces 78 alone are not sufficient to support the airfoil 62 relative to the disk 64. As one example of a compromise in the primary contact surfaces 78 includes a structural strain leading to at least a partial bending, deflection, or failure of the manner in which the airfoil 62 is supported relative to the disk 64.

With continued reference to the example of FIG. 3, a compromise in the primary contact surfaces 78 causes the airfoil 62 to move axially upward relative to its position in FIG. 2, thereby closing the gap 86 such that the radially outer surfaces 88a-b of the teeth 68a-b, respectively, contact the radially outer surfaces 90a-90b of the cavities 72a-b. The secondary contact surfaces 80 are sufficient to support the airfoil 62 relative to the disk 64, at least until the compromise in the primary contact surfaces 78 can be discovered by way of sensors associated with the primary contact surfaces 78 or by way of a routine engine inspection, as examples.

It should be understood that while the primary contact surfaces 78 are illustrated as being radially inward of the secondary contact surfaces 80, the primary and secondary contact surfaces could be reversed such that the primary contact surfaces are radially outward of the secondary contact surfaces. In this example, during a normal operating condition, the radially outer teeth would be engaged with the radially outer cavities, and the radially inner teeth would have a gap between the radially outer surfaces of the teeth and the cavities.

While only two pairs of teeth are shown, it should be understood that this disclosure extends to examples that include any number of pairs of teeth. That is, an airfoil attachment according to this disclosure could include any number of primary and secondary contact surfaces.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. An airfoil attachment comprising:
   an airfoil and a disk supporting the airfoil, there being primary contact surfaces and secondary contact surfaces between the airfoil and the disk, the secondary contact surfaces not being engaged during a normal operating condition in which the primary contact surfaces are sufficient to support the airfoil relative to the disk without the aid of the secondary contact surfaces, wherein one of the secondary contact surfaces is provided by a tooth and there is a gap around the entirety of the tooth during the normal operating condition.

2. The airfoil attachment as recited in claim 1, wherein the airfoil includes a root having a first tooth and the disk includes a first cavity, the primary contact surfaces provided by the first tooth being received in the first cavity.

3. The airfoil attachment as recited in claim 2, wherein, during the normal operating condition, a radially outer surface of the first tooth contacts a radially outer surface of the first cavity.

4. The airfoil attachment as recited in claim 2, wherein the root of the airfoil includes a second tooth and the disk includes a second cavity, the secondary contact surfaces provided by the second tooth being received in the second cavity.

5. The airfoil attachment as recited in claim 4, wherein the first tooth and the second tooth are radially spaced from one another.

6. The airfoil attachment as recited in claim 4, wherein the second tooth is smaller than the first tooth in a radial dimension.

7. The airfoil attachment as recited in claim 4, wherein the second tooth becomes engaged with the second cavity should there be a compromise in the engagement between the first tooth and the first cavity.

8. The airfoil attachment as recited in claim 7, wherein a radially outer surface of the second tooth engages a radially outer surface of the second cavity should there be a compromise in the primary contact surfaces.

9. The airfoil attachment as recited in claim 8, wherein there is a gap between a radially inner surface of the second tooth and a radially inner surface of the second cavity when the radially outer surface of the second tooth engages the radially outer surface of the second cavity.

10. A method for redundantly securing an airfoil to a disk comprising:
    providing primary contact surfaces and secondary contact surfaces between an airfoil and a disk, the primary contact surfaces engaged during a normal operating condition in which the primary contact surfaces are sufficient to support the airfoil relative to the disk without the aid of the secondary contact surfaces, wherein the secondary contact surfaces are not engaged during the normal operating condition, wherein one of the secondary contact surfaces is provided by a tooth and there is a gap around the entirety of the tooth during the normal operating condition; and
    engaging the secondary contact surfaces should there be a compromise in the primary contact surfaces.

11. The method as recited in claim 10, wherein the primary contact surfaces are provided by a first tooth of a root of the airfoil being received within a first cavity of the disk.

12. The method as recited in claim 11, wherein the secondary contact surfaces are provided by a second tooth of the root of the airfoil being received within a second cavity of the disk.

13. The method as recited in claim 12, wherein, when the secondary contact surfaces are engaged, there is a gap between a radially inner surface of the second tooth and a radially inner surface of the second cavity.

* * * * *